United States Patent [19]

Hanagan et al.

[11] Patent Number: 5,290,088
[45] Date of Patent: Mar. 1, 1994

[54] SEAT-BACK DASHBOARD FOR VEHICLES HAVING TANDEM SEATING

[76] Inventors: Michael W. Hanagan, 3027 Twin Palms Dr., Aptos, Calif. 95003; John Lazzeroni, P.O. Box 26236, Tucson, Ariz. 85726

[21] Appl. No.: 792,506
[22] Filed: Nov. 12, 1991
[51] Int. Cl.$^5$ .................................. A47C 7/40
[52] U.S. Cl. ........................ 297/191; 297/217; 297/243; 297/215.11
[58] Field of Search ......... 297/191, 217, 243, DIG. 9; 455/344, 345, 346; 379/430

[56] References Cited

U.S. PATENT DOCUMENTS

| | | | |
|---|---|---|---|
| 1,704,415 | 3/1929 | Wenegrat | 297/217 |
| 2,257,496 | 4/1939 | Gaugler et al. | 297/217 |
| 2,879,835 | 3/1959 | Miller | 297/217 |
| 2,973,431 | 2/1961 | Sontheimer | 455/345 X |
| 3,019,050 | 1/1962 | Spielman | 297/191 |
| 4,466,660 | 8/1984 | Mabie | 297/DIG. 9 |
| 4,584,603 | 4/1986 | Harrison | 297/191 X |
| 4,602,358 | 7/1986 | Sato | 455/345 X |
| 4,630,821 | 12/1986 | Greenwald | 297/191 X |
| 4,702,519 | 10/1987 | Lobanoff | 297/191 X |

FOREIGN PATENT DOCUMENTS 3723027  9/1988  Fed. Rep. of Germany ...... 297/191

*Primary Examiner*—James R. Brittain
*Attorney, Agent, or Firm*—LaRiviere & Grubman

[57] ABSTRACT

One or more recesses formed in the back of the back rest for the front seat of a tandem seat assembly for mounting a control panel and related chassis therein for passenger control of the communications, entertainment and other systems installed on the vehicle. The control panel may be electrically parallel to the driver's dash board, as well as containing independent systems and controls, thereby providing the capability for the passenger to safely control the intercommunications and entertainment systems of the vehicle.

13 Claims, 1 Drawing Sheet

SEAT-BACK DASHBOARD FOR VEHICLES HAVING TANDEM SEATING

TECHNICAL FIELD

This invention relates to motor vehicle accessory devices and more particularly to motorcycle two-rider seats adapted to place certain control devices for use by the passenger in the back of the seat backrest for the driver.

BACKGROUND ART

The motorcycle is becoming a popular form of transportation, due in part to its fuel economy, maneuverability and the ease with which parking space may be found. Present-day motorcycles are also popular as touring vehicles for short and extended vacation travel. This popularity has created a demand for methods to adapt the conventional single rider vehicle so that a companion may be accommodated. These adaptations may be made either at the time of ordering the vehicle or as an after purchase option.

Most motorcycles are originally equipped with a single seat for a single operator, but many motorcycle buyers equip their purchase with seats adapted to accommodate two riders, frequently including a back rest for each position to provide back support for each rider. This modification makes the vehicle more comfortable, and therefore more desirable, for extended use, as for example commuting to work or for touring.

The popularity of the motorcycle, especially one equipped for two or more riders, has created a demand for accessories to make the motorcycle more pleasant to ride. One accessory often added is a communication system, usually consisting of at least a radio to receive commercial broadcasts and an intercommunications system for the driver to communicate with a passenger via crash helmets equipped with microphone and audio systems.

Communications between the driver and passenger on a motorcycle is difficult, due to the wind, vehicle and traffic noise which buffets the riders. This problem has been addressed in several ways, both acoustically and electronically.

U.S. Pat. No. 4,473,130 (Koerber et al.) discloses an approach to enhance communications between riders by use of acoustic channelling, in the manner of a stethoscope conveying sounds to a doctor's or nurse's ears. Koerber discloses how communications between riders is enhanced by the use of such sound-carrying tubes but does not suggest any way that the passenger can influence or control the communications, short of disconnecting the acoustic tubes.

U.S. Pat. No. 4,206,409 (McKinney) discloses the use of an electronic intercommunications system which utilizes electrical wiring connected between two or more helmets. The electronics comprising such a communications system is well known in the art and McKinney teaches that the addition of a take-up reel for the wiring serves to control the slack in the wiring and keep it from presenting a hazard to the riders. McKinney further discloses that the electronic system may be contained in a box suitable for also holding the helmets and the controls for the electronic device. McKinney suggests that the box could be mounted out of the way of the riders, as at the rear of the motorcycle. This places the controls out of the reach of both driver and passenger, requiring them to make any desired adjustments before beginning their journey.

U.S. Pat. No. 3,586,977 (Lustig et al.) discloses how the addition of an electronic package on a belt can allow the riders to enjoy either commercial broadcasts or intercommunications. The electronic device described by Lustig has any controls therefor mounted on the case which is secured to the belt. This places the controls within the reach of the driver and perhaps also within reach of the passenger who must reach around the driver's seat back to operate them. In both cases the operator cannot conveniently see the controls being operated, relying instead on touch and memory to select the desired control.

Each of the cited patents addresses the problems of communications between riders, but none address the question of how to control the communications systems conveniently and safely.

In the present art, the variety of electronic communications systems available to the motorcycle owner is nearly unlimited. Electronic systems for receiving commercial broadcasts or citizen band transmissions, playing prerecorded music and serving also as an intercommunications system are readily available and commonly added to the motorcycle as dealer installed options. The controls for the installed system are placed on the driver's panel, usually located in the space immediately in front of the driver. This requires that all adjustments to volume, channel or subsystem be made by the driver.

DISCLOSURE OF INVENTION

The present invention provides convenient placement of and monitoring for passenger accessory equipment, including control panel and related chassis hereinafter referred to as a passenger control panel, in the back of the back rest for the front seat of a tandem seat assembly for motorcycles and the like. By so mounting such equipment, the controls are readily accessible to and are in view of the passenger who can then conveniently and safely reach and adjust the controls as desired. The control functions selected may be, for example, volume control of the passenger's receiver, channel selection for either or both riders, or other combinations of equipment and accessories adapted for such vehicles. The present invention provides an important alternative to the unsafe practice of the driver diverting his attention from the road to make the adjustments to volume or subsystem, as well as the equally unsafe practice of the passenger reaching around the driver or elsewhere on the vehicle to attempt to adjust the controls.

The accessory equipment contemplated by the present invention includes, but is not limited to, equipment which augments or duplicates some or all of accessories available to the driver, such as interpassenger communications systems, or are entirely separate and independent of driver-accessible equipment, such as tape and CD players. It should be noted that the accessory equipment or the particular mounting configuration or requirements thereof form no part of the present invention.

To mount the passenger control panel in the back of the driver's back rest, the front back rest is constructed with a recess, or perhaps more than one recess, for receiving one or more chassis and controls, and a similarly recessed channel is provided within the seat back for routing the necessary electrical wiring to the panel.

The recess may be placed anywhere in the back of the seat back, and could occupy a substantial part of the area thereof. Typically, the recess is placed to one side of the seat back to facilitate seeing and access to the control panel placed therein. Placing the control panel to one side further facilitates connection of the electrical connecting cable from the passenger's helmet to the control panel. This offset allows the connecting wires to be routed from the side of the helmet along the shoulder and arm to the control panel.

In practice, the control panel will normally be offset to the left side as most motorcycles have their kickstand on the left and most riders and passengers mount the vehicle from the left side. This allows the communications connection to be most conveniently made after mounting and to be disconnected before dismounting from the vehicle.

Alternatively, one recess could be placed in the left side of the seat back to receive the connections between the passenger's helmet wiring and the vehicle's communications system, and a second recess placed in the right side of the seat back to receive the electronic controls for the communications system. This would facilitate the connection as described above and better accommodate a right-handed passenger's manipulation of the controls. Obviously, such placement of the connections and control panel could be reversed during installation to accommodate left-handed passengers as well.

The recess is, or recesses are, formed when the seat back is constructed, and sized to accommodate a modular control panel. The panel selected for the communications system to be installed may be of any size suitable for the intended use. The present art of miniaturization of electronic components allows an abundance of control capability within a relatively small space. The most practical control panel, however, should accommodate a rider wearing gloves.

The electronic controls utilized for the communications system can be of any type common to the communication art. For example, push buttons, slide switches, toggle switches, potentiometers and the like may be used. In all cases, it would be preferable that the seat back cavity accommodated further recess of the controls to reduce or eliminate protrusion into the chest and/or abdomen of the passenger during an emergency stop or crash, and to preclude their presenting a safety hazard while mounting or dismounting the vehicle.

The wiring channel is routed from the recess to the bottom of the seat back. This channel is also formed when the seat back is manufactured and can be placed on either the right or left side. In practice, it may be desirable to standardize on a single exit point along the periphery of the seat back rest to facilitate standardization of placement of the communication system wiring harness. It is understood that when more than one control panel is utilized a wiring channel connecting each panel is utilized.

The placement of the controls for the vehicle communication system in the seat back may occur regardless of where the system components are installed. The system components may be placed on the vehicle or in the rider's helmets while the controls are placed as described herein. In some forms of the electronic art, it is possible for the control of the components to be accomplished without the use of interconnecting wires.

While the present invention is described in terms of motorcycle usage, it is not limited in application to only motorcycles. The present invention may also be utilized in other vehicles having tandem seating such as kayaks, snowmobiles and the like, for operation of controls by passengers in the second seat of the vehicle.

BRIEF DESCRIPTION OF DRAWINGS

For fuller understanding of the present invention, reference is made to the accompanying drawing in the following detailed Description of the Preferred Embodiment of the invention. In the drawing.

Figure 1:
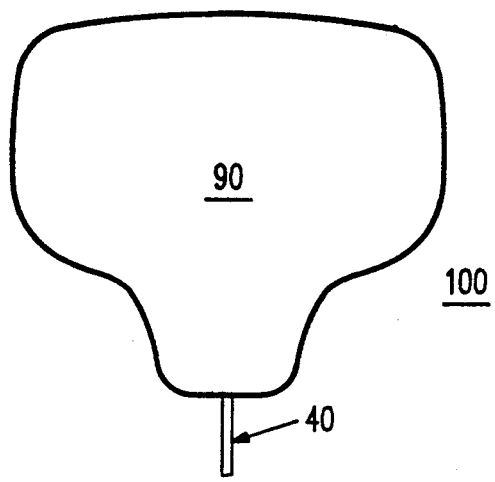
FIG. 1 is a front view of a back rest for attachment to the driver's seat of a motorcycle constructed according to the present invention.

Reference numbers refer to the same or equivalent parts of the present invention throughout the several figures of the drawing.

BEST MODE OF CARRYING OUT THE INVENTION

Figure 2:
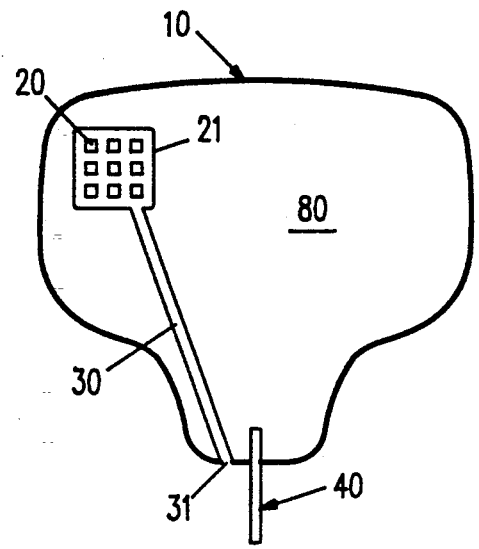
FIG. 2 is a back view of the back rest of FIG. 1, indicating a typical placement of a control panel.
Figure 3:
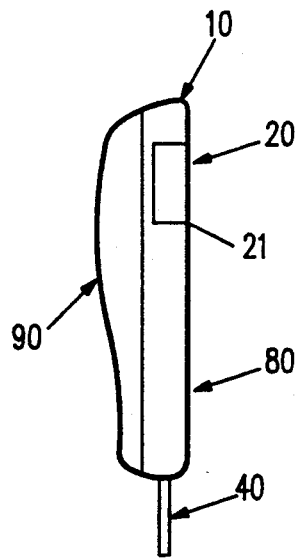
FIG. 3 is a side view of the back rest of FIG. 1.

Referring now to FIGS. 1 through 3, a seat back rest 100 constructed according to the principles of the present invention is shown. The driver's side 90 of rest 100 is contoured and padded in any manner common in the art. Passenger side 80 may be flat as shown or contoured or padded as desired. Rest attaching mechanism 40 is any suitable attaching method adapted to the seat to which rest 100 is to be attached. These features do not form a part of the present invention but are presented herein to more clearly describe the placement of the present invention.

Referring now to FIGS. 2 and 3, the cavity for receiving the control panel is shown. Cavity 21 is formed in the body of seat back 100, preferably at the time of manufacture of back 100. Cavity 21 is off set to one side or the other as illustrated in FIG. 2 so as to allow the installed control panel to be conveniently seen and reached by the passenger. Cavity 21 may be of any size and configuration, including mounting requirements, necessary to accommodate the control panel and related chassis to be installed. In practice, it may be desirable to standardize the size, shape and placement of cavity 21 to best accommodate the electrical connection of the installed panel to the vehicle communication system wiring harness.

Figure 4:
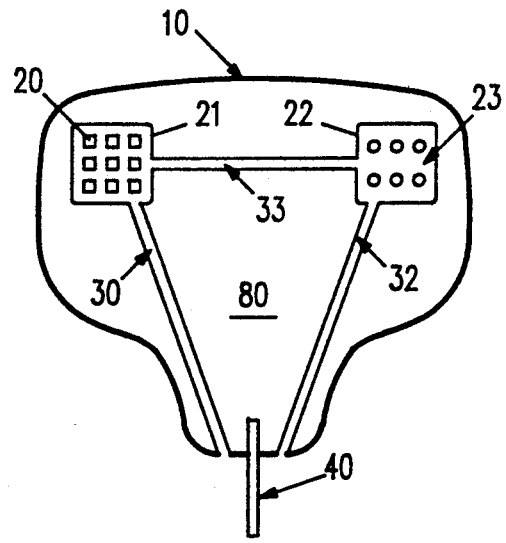
FIG. 4 is a back view of the back rest of FIG. 1, indicating the placement of dual control panels.

Referring now to FIG. 4, a dual panel arrangement is shown. In some circumstances it may be desirable for more than one cavity 21 and 22 to be formed in the seat back as shown in FIG. 4. For example, it may be desirable to place a portion of the electrical controls in one cavity and the remainder in the other. It may also be desirable in some circumstances to place controls for the vehicle communication system in one cavity and an additional system or component thereof in the second cavity.

As shown in FIG. 4, wiring channel 30 is utilized to serve control panel 20 and channel 32 serves panel 23. Channel 33 allows for interconnection of panels 20 and 23 if desirable. It is recognized that either channel 30 or 32 could be eliminated and all wiring be routed through the remaining channel and channel 33. It may prove desirable to utilize all three channels so that one seat back may be used for any possible vehicle combination.

Referring again to FIG. 2, Panel 20 is any suitable electrical control device with buttons, knobs or switches suitable for controlling the communication system installed on the vehicle. Typical devices may slide or rotate potentiometers, toggle or push switches or the like. Panel 20 is preferably mounted within rear surface 80 so as to provide a flush, relatively smooth surface conforming to the surface contour of passenger side 80. Where the control knobs and the like protrude from the surface of panel 20, panel 20 must be further recessed into cavity 21 so that such knobs and the like are still within the surface contour of passenger side 80. Such mounting arrangement is preferred to avoid possible safety problems caused by protuberances which may interfere with the passenger's movements or cause injury in the event of an emergency stop or a collision. Panel 20 and placement of controls thereon are preferably constructed for convenient operation by a passenger wearing gloves.

Electrical wiring channel 30 extends from cavity 21 within which panel 20 is fitted, to the lower perimeter 10 of rest 100. Channel 30 point of exit 31 is located proximal attachment 40 in a location which is suitable for the specific seat and attachment combination utilized. The specific location is varied according to the need for further routing the electrical wiring to the communication system installed. In practice it may be necessary to provide either left or right hand exit locations so as to accommodate vehicles of different manufacture or model. It may also prove desirable to provide dual channels, one each exiting on either side of attachment 40 so that any vehicle may be accommodated with a single seat back. The use of wireless electronic control devices would allow the elimination of channel 30.

The seat back configuration of the present invention may be utilized in any vehicle which carries a passenger in a seat located in tandem behind the seat provided for the driver. This may be, for example, a snow mobile, a glider, jet ski or the like. Placement of the control panel may also be varied to other locations convenient for operation by the passenger if necessary for special applications. The present invention may also be utilized for example, in an aircraft where it is desirable to minimize the weight added by a structural member for supporting a separate dash board for the rearward occupant.

The present invention has been particularly shown and described with respect to certain preferred embodiments thereof. However, it should be readily apparent to those of ordinary skill in the art that various changes and modifications in form and details may be made without departing from the spirit and scope of the invention as set forth in the appended claims.

I claim:

1. A seat back for a motorcycle having a tandem seat assembly, the tandem seat assembly having a forward driver's seat and at least one rearward passenger's seat on the motorcycle, said seat back having a perimeter, said seat back disposed between the forward driver's seat and the rearward passenger's seat, said seat back comprising:
   a front surface of said seat back;
   a rear surface of said seat back opposite the front surface, said rear surface having a cavity formed therein, said rear surface including an electrical control panel, said cavity for receiving the electrical control panel, said control panel including duplicate controls for a two-way intercommunication system; and
   a channel connecting said cavity to the perimeter of said seat back, said channel appropriately sized for conducting electrical wiring from said control panel.

2. A seat back as in claim 1 wherein said cavity is off set from the center of the rear surface of said seat back.

3. A seat back as in claim 1 wherein said cavity is symmetrically located around the center of the rear surface of said seat back.

4. A seat back as in claim 1 wherein said control panel includes independent controls for said intercommunication system.

5. A seat back as in claim 1 wherein said rear surface includes a plurality of cavities and electrical control panels, said electrical control panels including electrical controls, said electrical control panels are mounted in said cavities so that the electrical controls are within a contour of the rear surface of the seat back.

6. A seat back for a motorcycle and like vehicles of the type having a tandem seat, the tandem seat having a forward seat and a rearward seat, said seat back having a perimeter, said seat back disposed between the forward seat and the rearward seat, said seat back comprising:
   a front surface of said seat back;
   a rear surface of said seat back opposite said front surface, said rear surface having a plurality of cavities formed therein and electrical control panels, said cavities for receiving the electrical control panels;
   a plurality of channels for receiving electrical wiring connecting each of the said cavities with the other cavities; and
   at least one channel connecting at least one said cavity to the perimeter of said seat back for conducting electrical wiring from said control panels.

7. A seat back as in claim 6 wherein said control panels include duplicate controls for a communication system.

8. A seat back as in claim 6 wherein said electrical control panels include electrical controls, said electrical control panels are mounted in said cavities so that the electrical controls are within the contour of the rear surface of the seat back.

9. A seat back for a front seat of a motorcycle or like vehicle having a tandem seat assembly, the tandem seat assembly including said front seat and a rear seat, said front seat and said rear seat being for a first and a second occupant respectively, said seat back comprising:
   a front surface of said seat back of said front seat for supporting the back of the first occupant; and
   a rear surface of said seat back of said front seat having a cavity formed therein and an electrical control panel, said cavity for receiving said electrical control panel for use in controlling electronic devices through wireless means.

10. A seat back as in claim 9 wherein said electrical control panel includes electrical controls, said electrical control panel is mounted in said cavity so that the electrical controls are within a contour of the rear surface of the seat back.

11. A seat back for a tandem motorcycle seat, the tandem motorcycle seat having a front seat and a rear seat, said seat back comprising:
   a front surface for supporting the back of a single occupant of said front seat;
   a rear surface having a plurality of cavities formed therein and having electrical control panels, said cavities for receiving said electrical control panels, said control panels including duplicate controls for a communication system; and a channel connecting at least one of said cavities to the perimeter of said seat back, said channel appropriately sized for conducting electrical wiring from said control panels.

12. A seat back as in claim 11 wherein said control panels include independent controls for said communication system.

13. A seat back as in claim 11 wherein said electrical control panels include electrical controls, said electrical control panels are mounted in said cavities so that the electrical controls are within a contour of the rear surface of the seat back.

* * * * *